United States Patent [19]

Destree

[11] 4,310,198
[45] Jan. 12, 1982

[54] HYDRAULIC POWER SUPPLY VEHICLE FOR CONCRETE CUTTING AND BORING TOOLS

[76] Inventor: Allen Destree, 5218 92nd SW., Everett, Wash. 98204

[21] Appl. No.: 133,612

[22] Filed: Mar. 24, 1980

[51] Int. Cl.³ .............................................. E21C 47/00
[52] U.S. Cl. ....................................... 299/39; 125/14; 404/85
[58] Field of Search .................................. 125/12, 14; 51/134.51 Z; 299/39; 180/306, 6.2; 404/85, 86

[56] References Cited

U.S. PATENT DOCUMENTS

| | | | |
|---|---|---|---|
| 1,823,774 | 9/1931 | Williams | 299/39 |
| 3,141,702 | 7/1964 | Barton | 299/39 |
| 3,250,340 | 5/1966 | Roberson | 180/306 |
| 3,645,349 | 2/1972 | Nichter | 180/6.48 |
| 3,908,315 | 9/1975 | Schaller | 51/134.5 F |
| 4,093,048 | 6/1978 | Hakes | 180/6.2 |

Primary Examiner—Harold D. Whitehead
Attorney, Agent, or Firm—David L. Garrison; Randy A. Gregory

[57] ABSTRACT

A self-propelled hydraulic power supply vehicle and tool mounting platform having an hydraulic fluid reservoir integral with and forming the structural frame of the vehicle, hydraulically actuated driving and steering apparatus for moving the vehicle across a support surface while performing a cutting operation on the support surface, and castor wheels facilitating vehicle mobility which are rotated into operative position raising the vehicle so that the wheels normally supporting the vehicle are raised out of contact with the surface for mobility when the device is not cutting the support surface.

7 Claims, 8 Drawing Figures

HYDRAULIC POWER SUPPLY VEHICLE FOR CONCRETE CUTTING AND BORING TOOLS

BACKGROUND OF THE INVENTION

This invention is in the field of self-contained hydraulic power supply units and more particularly a self-propelled hydraulic power supply and tool mounting platform.

Portable concrete slab saws are often utilized in making cuts and modifications to previously formed and hardened concrete and asphalt. Such portable slab saws are necessary to make the vertically oriented cuts in street paving for the redefinition of street boundaries and curb lines as well as for maintenance procedures on expansion joints in concrete slabs. These saws are also frequently used in cutting trenches in concrete for cable and pipe laying in both streets and in new building construction or renovation, and they are especially useful wherever it is desired to obtain a cut with a relatively smooth kerf line rather than a cut with the very rough edges given by pneumatic or hydraulically powered breakers or hammers.

A major cost incurred in the slab sawing or concrete is the cost of saw blade replacement. The frequency of blade replacement is dictated by many things, but an important one among them is the amount of vibration introduced to the spinning blade by the engine and drive belts or chains. The more vibration that is transmitted to the blade by an engine and drive mechanism, the more rapid the destructive wear that takes place on the diamond-cutting matrix of the blade. The slab saws in current use do not operate at an optimum cost efficiency because of this excessive destructive vibration introduced to the blades, hence, cost for replacing the blade and downtime of the equipment can become excessive. The prior portable saw device, being relatively light for handling purposes, does not serve as a sufficiently steady and firm platform for the blade, thus permitting excessive vibration of the blade and attendant excessive saw blade wear and occasional blade breakage.

Long, relatively deep, cuts are often made in concrete for expansion joints or to form utility trenches so that cables or pipes can be laid. Obtaining a long, deep cut on a predesignated line with a minimum of roughness to the cut edges is a feat that current versions of the self-propelled slab saw are often unable to perform. Prior portable devices, being relatively light and with excessive vibration for handling purposes are easily deflected from the intended course of travel, with possible damage to the saw blade as its path of travel is altered while deeply inserted within the kerf.

The results of the vibration inherent in current versions of slab saws can be greatly reduced when the saw blade is driven by a hydraulic motor and when attached to a heavy secure, vibration-resistant tool mount. The power supply comprising a hydraulic motor, driven by a hydraulic pump and in turn driven by a gasoline engine has much less vibration applied to the saw blade than the power supply consisting of a direct drive or a drive through belts or chains from a gaoline engine.

Hydraulic power supplies heretofore known have required the presence of an auxiliary means to dissipate heat generated in the hydraulic fluid as it is pumped and then used to energize motors for powering appliances. Such prior power supplies are positioned remote from the appliances, connected to the portable appliance by suitable hoses.

The heat generated by the hydraulic fluid must be dissipated effectively or power is reduced and equipment breakdown can result. Also, hydraulic power supplies have not been as compact and portable as the direct gasoline-driven tools such as slab saws. The interiors of some buildings and other enclosed areas have accordingly been inaccessible to hydraulic power supplies and tools and their advantages.

OBJECTS OF THE INVENTION

It is an object of this invention to provide a compact, self-propelled, hydraulic power supply.

It is an additional object of this invention to provide with the aforementioned power supply, a compact self-propelled hydraulic tool mounting platform having superior resistance to vibration.

It is a further object of this invention to provide for efficiency in cooling of hydraulic fluid and for efficiency of hydraulic tool operation.

It is a still further object of this invention to provide a tool mounting assembly for use with a concrete slab saw mechanism, which assembly provides a secure, vibration resistant mount for slab saws to reduce slab saw blade replacement frequency and to provide faster and deeper slab saw cuts for a given power input to the blade.

It is a further object of this invention to provide a stable vibration-resistant movable platform for mounting and operating a rotative, diamond impregnated abrasive saw blade, whereby the saw may be used to cut a saw kerf in the subjacent concrete support surface at an optimum surface speed of the blade to maximize blade cutting efficiency and blade life.

SUMMARY OF THE INVENTION

A feature of the present invention which meets the foregoing objectives is the combination of a relatively large oil reservoir acting additionally as a vehicle frame, the reservoir having an elongated open-loop fluid path with relatively large surface area exposed to the ambient whereby heat generated in the operation of the device is dissipated. This combination serves both as a structural framework for the entire vehicle and as a self-cooling reservoir for hydraulic fluid. The reservoir and frame comprises a series of elongated hollow structural members joined to form a large continuous hydraulic fluid conduit through which oil flows, and which because of its surface area exposed to the atmosphere, is capable of efficiently dissipating heat from the hydraulic fluid and because of its strength and configuration is capable of serving as a structural frame for the entire vehicle. The weight of this hydraulic fluid and its particular distribution throughout the frame of the vehicle itself enhances the vehicle as a stable vibration-resistant tool mounting platform. The frame provides mounting means for a prime mover and hydraulic pump means for operating the hydraulic functions of the device.

The prime mover, such as a gasoline engine, is attached to and supported by the reservoir and frame and at least one hydraulic pump is driven by the prime mover.

The vehicle described herein is self-contained with a hydraulic fluid reservoir integral with a frame and at least one hydraulic pump. The vehicle is also provided with an hydraulically actuated driving and steering mechanism and an hydraulically actuated tool mounting assembly. Included as a part of the tool mounting assembly are a pair of tool mounting arms pivotally attached to the reservoir and frame and movable by a hydraulic actuator so that a tool can be raised and lowered from a first operating position to a second operating position relative to a support surface. Extending between the distal ends of the pivotally mounted tool mounting arms is a rigid tool receiving beam structure whereon tools such as a hydraulic rotary concrete saw or slab saw can be mounted. The beam structure can also receive other tools and appliances such as a fork lift for transporting a pallet or other platform, a tool stand such as is used in concrete core drilling and wall sawing operations and the like.

To further improve the operation of the self-contained hydraulic power supply described herein in situations wherein the power supply is to be used in confined locations limiting the heat dissipation potential, an auxiliary cooling means is provided. A water-filled cooling tube which passes through the reservoir and frame means into the oil-filled reservoir conducts cooling water into heat exchange with the oil. Water can be routed directly from a hydrant into the cooling tube to help dissipate the heat of the hydraulic fluid and thence to be discharged to a drain or may be discharged at the cutting edge of a concrete saw blade to act as a lubricant and means to remove cuttings from the saw kerf.

In this invention the vibration of the prime mover, such as a gasoline engine, is not transmitted through nor amplified by a direct mechanical linkage of the prime mover to the saw blade. The hydraulic pumps serve to dampen any vibration effects of the prime mover. A hydraulically actuated saw blade journaled for rotation on the tool mounting arm experiences significantly reduced vibration as compared to directly coupled devices and thus the blade has a longer working life and is capable of cutting more efficiently.

DESCRIPTION OF THE PREFERRED EMBODIMENT

Figure 1:
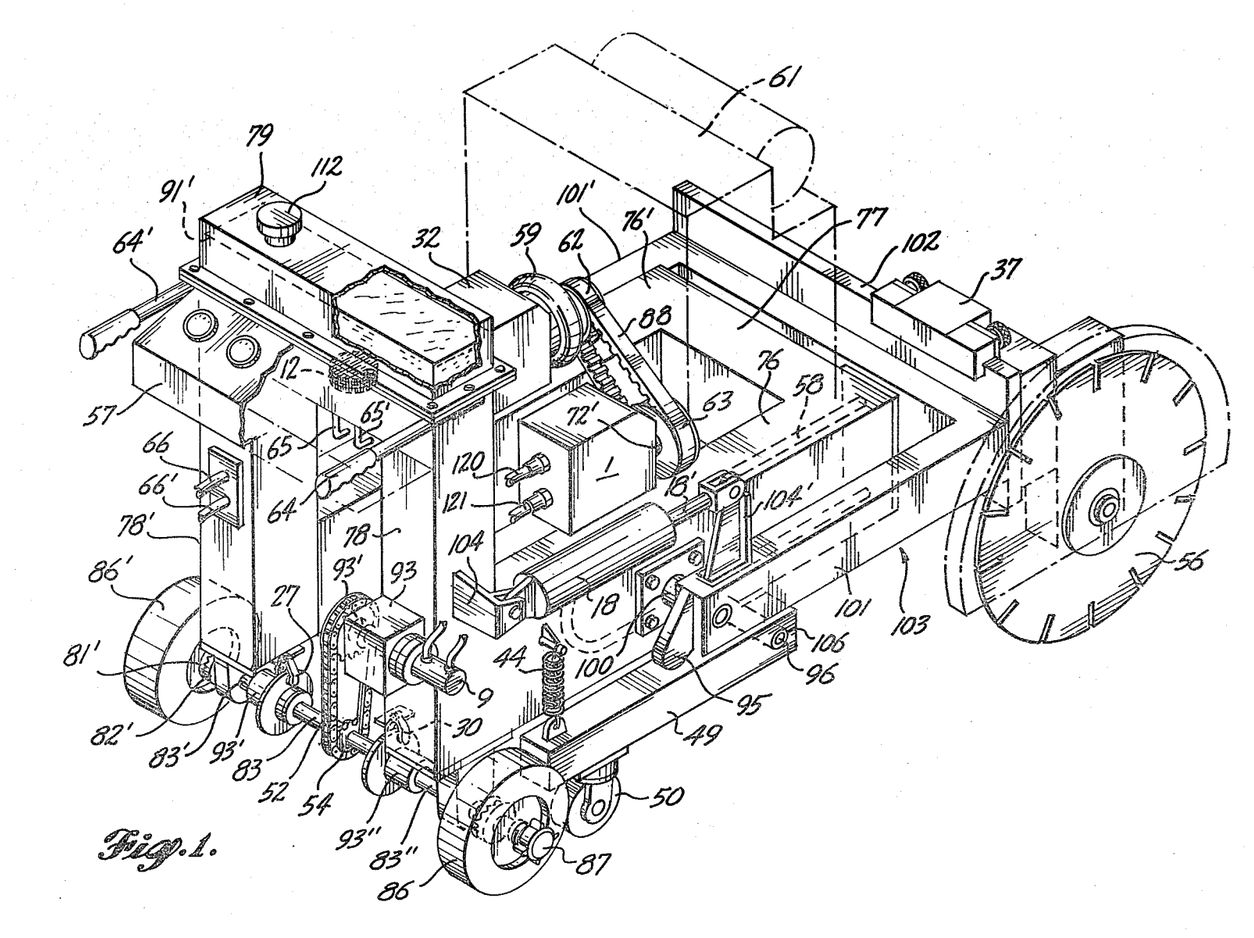
FIG. 1 is a perspective view partially cut away of the hydraulic power supply vehicle of this invention.
Figure 2:
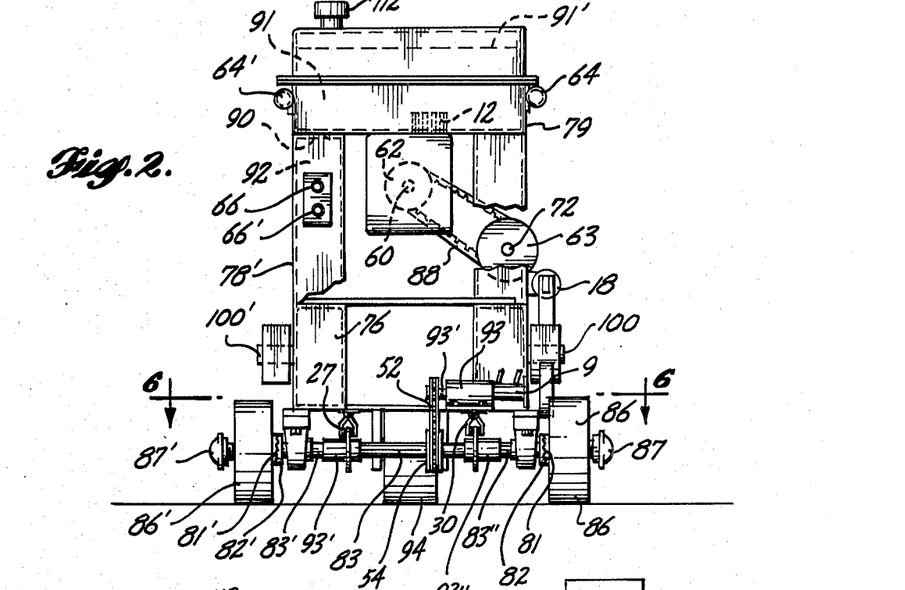
FIG. 2 is a rear elevational view partially cut away of the device shown in FIG. 1.
Figure 3:
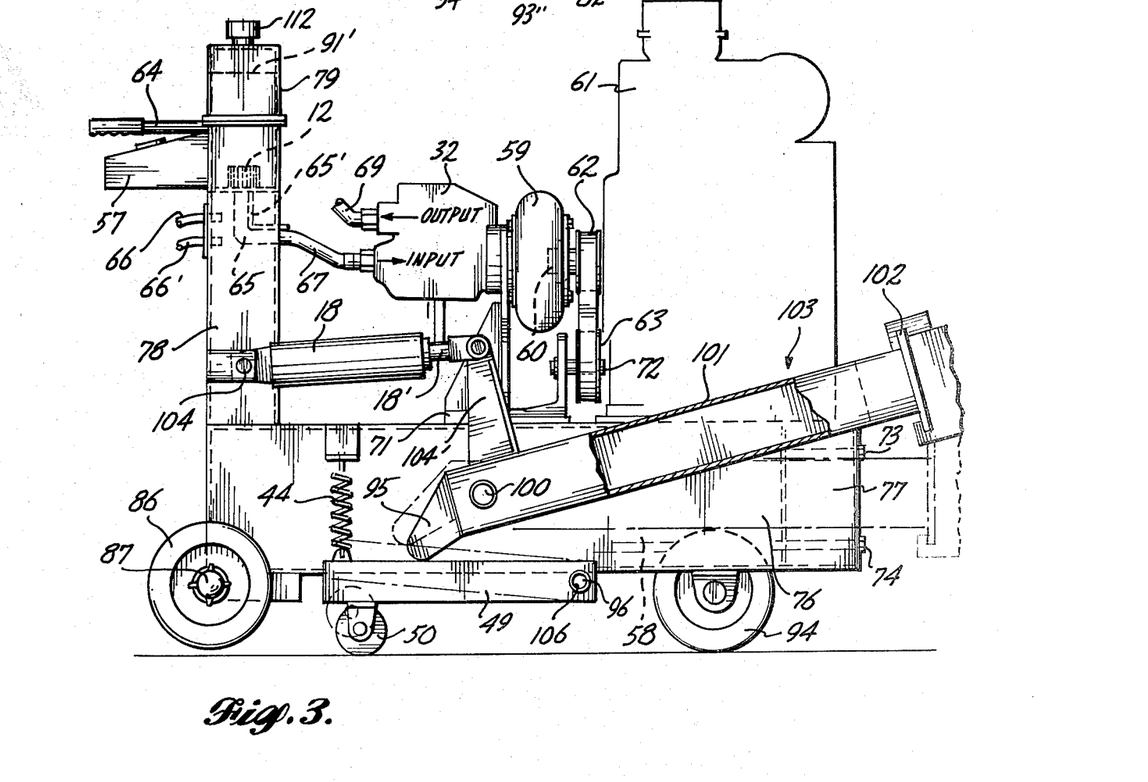
FIG. 3 is a side elevational view, partially cut away, of the device shown in FIG. 1.
Figure 6:
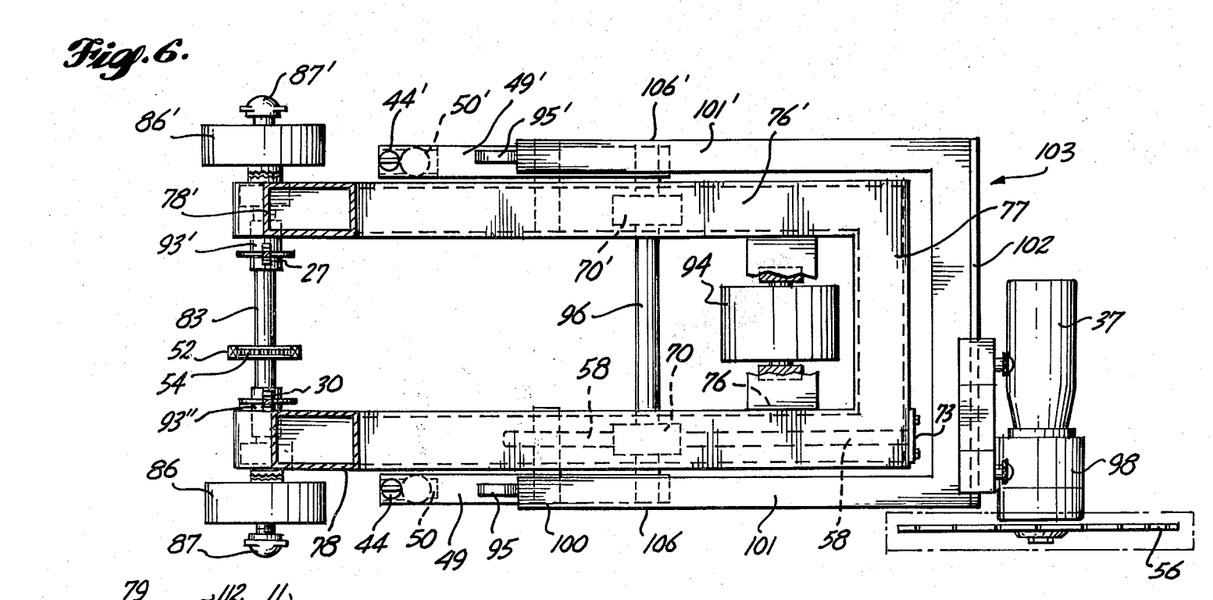
FIG. 6 is a sectional plan view of the apparatus shown in FIG. 1, taken along line 6—6 of FIG. 2.

Referring specifically to the drawings, wherein like numerals indicate like parts, there is seen in FIG. 1 a hydraulic power supply vehicle suitable for use in concrete cutting and boring operations in which a small, portable power supply is needed. The device is self-contained and operates without the need of connection to a large power source such as is frequently mounted on a truckbed or trailer for operating concrete cutting devices. The vehicle comprises a frame made up of a series of elongated, hollow hydraulic fluid reservoir segments adapted to contain a substantial volume of hydraulic fluid and permit dissipation of heat from the fluid through the walls of the reservoir. The reservoir and frame, identified by numerals 76, 76', 77, 78, 78' and 79 is positioned as shown in FIG. 1 with the horizontal segments thereof adapted to receive and support a prime mover such as a gasoline motor and various associated hydraulic pumps and control devices for operating a concrete manipulating device. The vehicle has a three wheeled or tricycle undercarriage, the rear wheels 86 and 86' being operatively connected to a drive mechanism and being equipped with harmonic drives 93, 93' and 93" for differentially steering the wheels 86 and 86' all as more fully described below. A forward single wheel 94 as shown in FIGS. 2, 3 and 6 is a wide, solid wheel which preferably is non-steerably connected to the frame or may be a castor type wheel to enhance the steerability of the device. The vehicle has a control console 57 having various of the usual control functions found in a system in which an internal combustion engine is utilized to operate hydraulic pump devices and may include pressure gauges and regulators, fluid control valves, engine operating controls, pump output control devices and the like. A pair of operator handles 64 and 64' aid in the movement of the device from one location to another.

A tool mounting mechanism is journaled upon shaft 100 to pivotally engage the frame and reservoir at reservoir segments 76 and 76'. A hydraulic cylinder 18 and piston 18' raises and lowers the front of the tool mount by pivotal motion of tool mounting arms 101 about shaft 100. Hydraulic cylinder 18 is a double acting cylinder and piston to provide positive control over the location of the tool mount 102 and to provide a downwardly directed force upon a tool if needed. A cam mechanism 95 engages castor lift arm 49 whenever the tool mount arm 101 is raised toward its uppermost position. The cam 95 forces arm 49 downwardly so that castor wheel 50 engages the support surface and wheels 86 and 86' are lifted from the surface. This permits easy movement of the device from one location to another.

The structural framework of the hydraulic power supply vehicle serves also as an efficient hydraulic fluid reservoir and heat dissipation means. As shown in FIGS. 1, 2 and 3, the reservoir and frame combination comprises six distinct reservoir segments identified by the numerals 76, 76', 77, 78, 78' and 79. Two side reservoir segments 76 and 76' extend the length of the vehicle and contain the bulk of the hydraulic fluid. A front reservoir segment 77 connects the side reservoir segments 76 and 76' across the front of the vehicle. Two upright reservoir segments 78 and 78' extend upwardly from the rearwardly positioned end of side reservoir segments 76 and 76' at the rear of the vehicle. A bridging reservoir segment 79 crosses between the upright segments 78 and 78'. The above described hollow reservoir segments provide a heavy, stable framework for the vehicle with an even weight distribution of hydraulic fluid.

The prime mover in the case of the preferred embodiment is a gasoline engine 61 as shown in FIGS. 1 and 3. Engine 61 is coupled directly by shaft 60 to a flexible coupling 59 which is in turn directly coupled to the hydraulic tool pump 32. With necessary valving and conduits and being controlled from the console 57 as shown in FIG. 1, the hydraulic fluid is pumped by the pump 32 to supply the power needed to operate a tool such as saw motor 37. Fluid is drawn by the pump 32 through a reservoir outlet 65 and through inlet hose 67 to pump 32. Pump 32 is a variable displacement pump such as a variable delivery axial piston hydraulic pump which pumps hydraulic fluid out the tool pump outlet 69 to a hydraulic motor such as tool motor 37 in FIG. 1. Hydraulic fluid returning from motor 37 enters reservoir return 66 in reservoir segment 78'. The hydraulic fluid, having been heated during its usage in the pump and motors, gives up heat to the atmosphere through the walls of reservoir 11 during the time it is resident therein.

Figure 7:
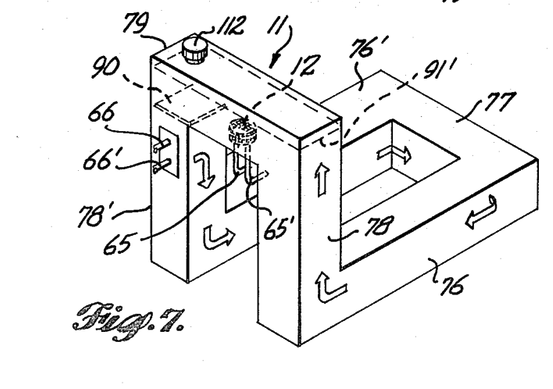
FIG. 7 is a perspective view partially cut away, of the reservoir and frame, showing the hydraulic fluid flow path therein.

A perspective view of the reservoir and frame 11 is shown in FIG. 7. A fill port 112 on bridging segment 79 is used to check and maintain the hydraulic fluid at about the level of fluid 91' shown. A baffle 90 provides a fluid barrier and separates the bridging segment 79 from the upright segment 78' below the baffle 90. Hydraulic fluid is first drawn from the chamber 91 by the hydraulic pumps 37 and 1. The fluid passes through the screen 12 and respective outlets 65 and 65' to pumps 37 and 1 and the associated hydraulic circuitry.

Hydraulic fluid returning from the pumps and motors is routed through return ports 66 and 66' into the upright segment 78'. The dark arrows show the direction of fluid flow through the segments of the reservoir 11 as fluid is added to upright segment 78' and withdrawn from bridging segment 79. The fluid flow therein and the constant fluid contact with the various conduit segment walls causes transfer of the heat the fluid has gathered in passing through the pumps and motors to the segment walls and thence to the atmosphere as the fluid circulates. The large surface area of the frame-reservoir insures that adequate cooling of the fluid will occur in normal operating circumstances.

A belt driven pump 1 is shown in FIG. 1 mounted on the upper surface of reservoir-frame segment 76 in a driven relationship with prime mover 61. A drive pulley 62 is shown mounted upon the drive shaft 60 of the prime mover 61. With a belt 88 as shown in FIGS. 1 and 2, the drive pulley 62 drives the pump pulley 63 on the pump pulley shaft 72. Pump 1 having an inlet 120 and outlet 121 provides pressurized hydraulic fluid to operate various functional components of the vehicle. For forward and reverse movement of the vehicle as well as differential or corrective steering a hydraulic drive mechanism is used.

A drive motor 9 is coupled directly to a harmonic drive transmission 93 such as model HDC-1M manufactured by the USM Corp., Route 128, Wakefield, Mass. 01880, more fully described below. The harmonic drive transmission 93 serves as a speed reducer from the motor 9 to a driving chain 52 which rotates a midaxle 83 through sprocket 54. At each end of midaxle 83 there is positioned harmonic drive transmissions 93' and 93" which are controlled by caliper brakes 27 and 30. The caliper brakes 27 and 30 are coupled with respective harmonic drive transmissions 93' and 93" and coupled with the harmonic drive transmission 93' and 93" are respective axle continuations 83' and 83". Without the actuation of either caliper brake 27 or 30, the axles 83' and 83" are coaxially coupled with axle 83 through the respective transmissions 93' and 93". Actuating either of the caliper brakes 27 or 30 differentially increases the rotation of the axles 83' or 83". As a result a gradual turn will be accomplished due to one of the rear wheels rotating at a slightly increased rate with respect to the other rear wheel.

Figure 8:
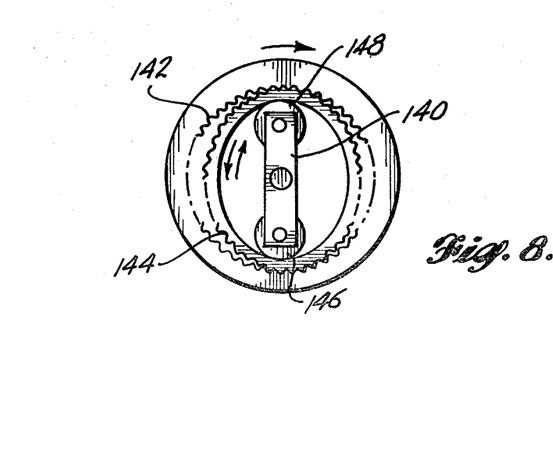
FIG. 8 is a schematic representation of the harmonic drive transmission.

The harmonic drive transmission used herein is shown schematically in FIG. 8. Harmonic drive transmissions employ a deflection wave transmitted to a non-rigid member or flexspline 144 to produce a high mechanical advantage between concentric parts. In the basic harmonic drive configuration, the wave generator 140 is the input element. It imparts an ellipse-like shape to the non-rigid flexspline 144, which normally functions as the output element. The shape imparted to the flexspline, but not the flexspline itself, rotates at the speed of the wave generator. The reduction ratio of a harmonic drive transmission is determined by the following formula:

$$\text{Ratio} = (N_f/N_f - N_c)$$

where $N_f$ is the number of teeth on the flexspline 144, and $N_c$ is the number of teeth on the circular spline 142. Note that since the circular spline has more teeth than the flexspline, the ratio will be negative. This means that the wave generator 140 and the flexspline 144 turn in opposite directions.

In the speed reducing application used with harmonic drive transmission 93, the circular spline 142 is held stationary, wave generator 140 is the power input from drive motor 9, and the flexspline 144 is the output, connected to drive chain 52. In the preferred embodiment a hydraulic motor having a maximum capacity of 8 gallons per minute of hydraulic fluid was used. This motor had a maximum speed rating of 1137 R.P.M., a displacement of 1.62 cubic inches per revolution and was capable of developing a maximum of 268 inch-pounds of torque. The harmonic drive transmission used was a Model HDC-1M manufactured by USM Corporation, Gear Systems Division, Route 128, Wakefield, Mass.

The harmonic drive transmissions 93' and 93" were also Model HDC-1M as described above, however the drive transmissions were mounted as speed increasers with the circular spline 142 as the power input from midaxle 83, the flexspline 144 as the output to the wheels and the wave generator being normally free to rotate but braked by hydraulically or manually activated caliper brakes 127 and 130, acting on discs 27 and 30 respectively. Suitable brake mechanism operators are well known in the art and are not shown in detail in the drawings.

As shown in FIGS. 2 and 6, the rear wheels 86 and 86' may be disengaged to rotate independently of their respective axles 83' and 83" by releasing locking hubs 87' and 87. A disconnect is accomplished since axles 83' and 83" are fixed toothed clutch halves 82' and 82, and the wheels 86' and 86 are fixed to mating toothed clutch halves 81' and 81. Wheels 86' and 86 are journaled for rotation on the respective axles 83" and 83' and are thus free to rotate independently of the axles whenever the toothed clutch halves are disengaged.

In addition to the rear wheels 86 and 86', the vehicle is supported by a preferably non-steerable tricycle wheel 94 as shown in FIGS. 2, 3 and 6. In certain instances where more maneuverability of the the device is required a steerable castor type front wheel or a plurality of front wheels could be used. Wheel 94 is a solid rubber wheel to provide a stable support.

A tool platform 103 is shown in FIGS. 1, 3 and 6 and comprises side mounting arms 101 and 101' and a front plate 102. Tool platform 103 is pivotally mounted to side reservoir segments 76 and 76' at pivots 100 and 100', as shown in FIG. 2. The tool platform 103 may thus be raised and lowered by retracting and extending the piston shaft 18' in cylinder 18. The cylinder 18 is pivotally attached to a mount 104 on the upright reservoir segment 78 and piston shaft 18' of the cylinder 18 is pivotally attached to a lever arm 104' extending upwardly from tool mounting arm 101. Cylinder 18 and its piston 18' can thus raise and lower tool mounting arm 103 to any desired height above the support surface.

Vehicle lift cams 95 and 95' are fixed to the mounting arms 101 and 101' rearwardly from pivots 100 and 100', as shown in FIGS. 1, 3 and 6. Raising the tool mounting arms 101 and 101' toward the position shown in FIG. 3 rotates cams 95 and 95' into contact with dual castor wheel arms 49 and 49' and pivots the castor wheel arms 49 and 49' about their pivots 106 and 106'. Continued raising of mounting arms 101 and 101' forces the castor wheel arms 49 and 49' downwardly against the bias of spring 44 and then raises the vehicle wheels 86 and 86' off the support surface so that the entire weight of the vehicle is supported by castor wheels 50 and 50' and the fixed front wheel 94. This support of the vehicle on the castor wheels 50 permits the operator to physically turn and guide the rear of the vehicle more easily than when the rear wheels 86 and 86' are engaged with the ground. A mounting shaft or torque tube 96, journaled for rotation in the supports 70 and 70' as shown in FIG. 6, is fixed to the castor wheel arms 49 and 49' and helps transmit equal rotational forces to the separate castor wheel arms 49 and 49'. When the tool mounting arm is lowered, the vehicle lift cams 95 and 95' will be disengaged from the castor wheel arms 49 and 49' and the castor wheel return spring 44 will retract the wheel arms 49 and 49' and the castor wheels 50 away from the support surface. The hydraulic motor 9 can then be used to drive the wheels 86 and 86'.

An auxiliary heat exchange tube 58 with an inlet 74 and an outlet 73 for the circulation of cooling water from a convenient source provides the vehicle with additional hydraulic fluid cooling capacity, beyond that capacity already offered by the large surface area of the frame-reservoir segments 76 through 79 being exposed to the atmosphere. The auxiliary cooler may be helpful and possibly necessary when the vehicle is used in an extremely hot climate or in a confined space wherein heat transfer from the frame-reservoir to the atmosphere is inadequate to cool the hydraulic fluid.

Figure 4:
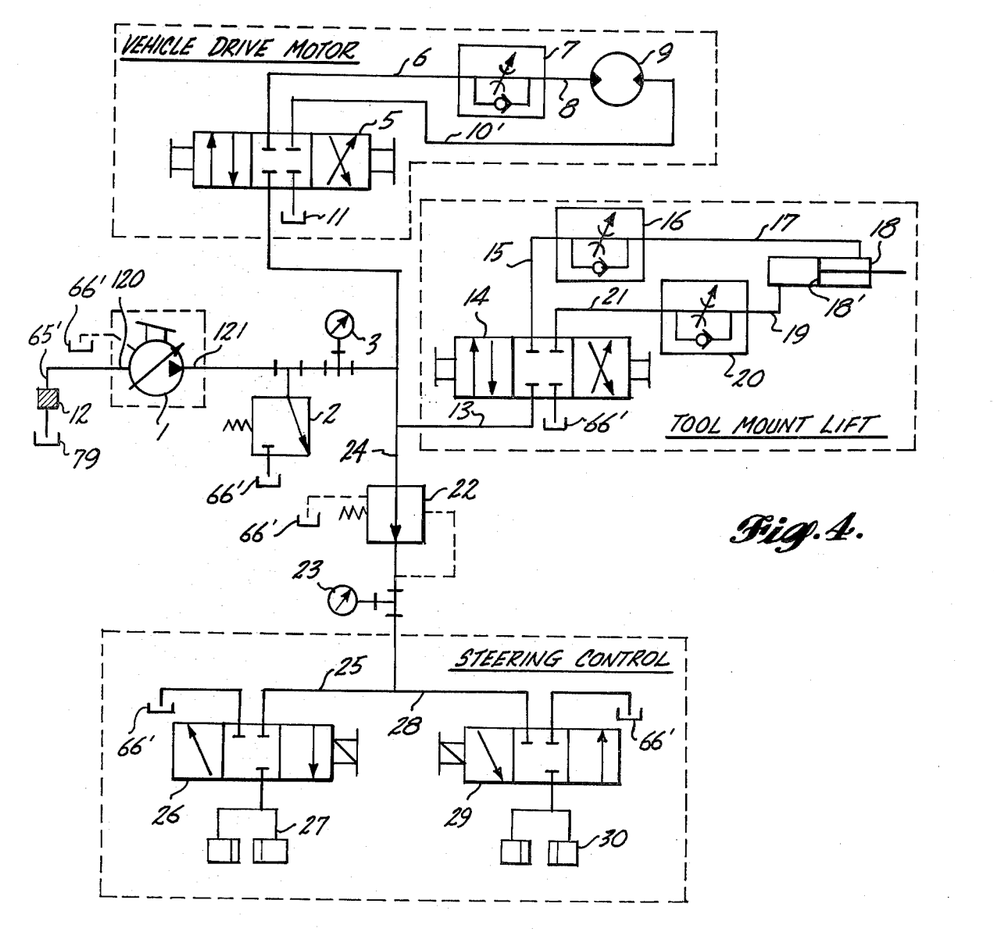
FIG. 4 is a schematic representation of the hydraulic circuitry utilized in this invention for steering, driving, braking and for raising and lowering the tool mount.
Figure 5:
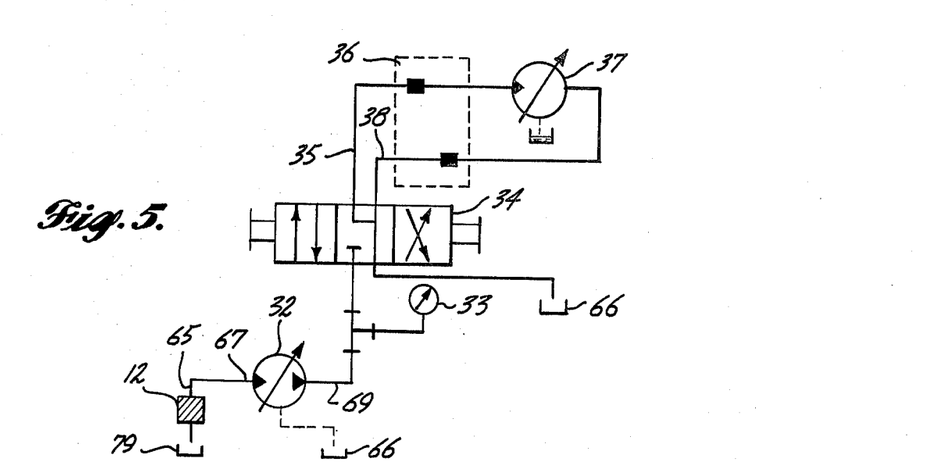
FIG. 5 is a schematic representation of the hydraulic circuitry utilized in this invention for operating a major energy consuming tool such as a slab saw or other cutting device.

Schematic diagrams of the hydraulic flow system of the preferred embodiment of this invention are shown in FIGS. 4 and 5, and certain elements thereof are shown in FIGS. 1, 3 and 6. A prime mover 61 such as a gasoline engine is drivingly coupled to the variable delivery hydraulic drive and accessory pump 1. In the preferred embodiment, a pump having the following characteristics was used:

| Type | axial piston |
|---|---|
| Manufacturer | Oilgear Company |
| Model | Hydura Type PUQ 06 |
| Theoretical displacement | 0.85 cubic inch/rev. |
| | 13.9 ml/rev. |
| Operating speeds | 1800 rpm rated |
| | 3000 rpm max |
| Rated continuous pressure | 3000 psi |

-continued

| | 206.9 bar |
|---|---|
| Maximum pressure | 3500 psi |
| | 241.4 bar |
| Delivery at rated rpm and pressure with flooded inlet | 6.0 gpm |
| | 22.7 l/min |

The drive pump 1, seen best in FIG. 1 and schematically in FIG. 4, draws fluid from chamber 79 of the frame-reservoir 11 through a screen 12 and reservoir outlet 65' to pump inlet 120. The output of drive pump 1 is channeled through outlet conduit 121 to a pressure relief valve 2, a pressure gauge 3 and thence through hydraulic lines 4, 24 and 13 to the various operative devices used to move and manipulate the vehicle.

Fluid passing through hydraulic line 24 enters pressure reducing valve 22 and the output pressure thereof is indicated by pressure gauge 22. Hydraulic fluid at the reduced pressure set by valve 22 is then supplied to hydraulic brake lines 25 and 28. Manually operated hydraulic valves 26 and 29 control the feed of pressurized hydraulic fluid to the actuating cylinders of caliper brakes 27 and 30; valves 26 and 29 also have a closed position and a return to reservoir 66' position. The schematic drawing of FIG. 4 shows valves 26 and 29 in a closed position. Translation of the valve to one of the other positions results in an application of hydraulic fluid pressure to the brakes or permits fluid to return to the reservoir 11 via return 66'.

Hydraulic fluid passing through hydraulic line 13 passes through a manual four-way valve 14 with a closed center position. The extreme left position of the manual four-way valve 14 will route hydraulic fluid through hydraulic line 15, through an adjustable pressure compensated flow control and check valve 16 and thence through hydraulic line 17 to the right side of piston 18' in the tool mount actuating cylinder 18. Hydraulic fluid returns to reservoir 11 through return 66 via the hydraulic line 21 through valve 14. When the four-way valve 14 is in its extreme right-hand position, the hydraulic lines 15 and 17 will serve as the return lines to the reservoir 11 through return 66', and the flow control valve 20 will supply the hydraulic fluid flow to the left side of piston 18' in cylinder 18.

The check valve portions of valves 16 and 20 allow hydraulic fluid returning from the actuating cylinder 18 to exhaust freely through the valves 16 and 20. Hydraulic fluid flowing toward the actuating cylinder 18 will be stopped by the check valve portions of valves 16 and 20 and routed through the adjustable flow control portion of valves 16 and 20 to provide an even, controlled flow of fluid to operate the piston and cylinder 18.

The hydraulic fluid passing through the hydraulic line 4 is used to drive the hydraulic motor 9 which in turn drives the wheels 86 and 86' of the hydraulic power supply vehicle. Depending upon which direction it is desired for the hydraulic motor 9 to revolve, the hydraulic fluid is routed with the manual four-way valve 5 through hydraulic line 10' to the motor 9 or through hydraulic lines 6 and 8 and through flow control valve 7 to the motor 9. In this way the hydraulic power supply vehicle can proceed in a forward or a reverse direction. The flow control valve 7 functions in the same manner as the above-mentioned flow control valves 16 and 20, that is, the hydraulic fluid flowing to the motor 9 is regulated as to pressure and flow volume and hydraulic fluid returning from the motor 9 has an unobstructed path of travel through the check valve portions of the valve 7. Only one flow control valve is needed since the forward speed only must be slowed and carefully controlled to provide the proper rate of cut by the abrasive saw 56 of FIG. 1.

As shown in the schematic of FIG. 5, a variable displacement hydraulic tool pump 32 is used to operate saw 56 or other tools. Pump 32 draws fluid from chamber 79 through filtering screen 12 to pump inlet 67. The hydraulic fluid flows out of pump 32 through outlet 69 to pressure gauge 33 and then to manual fourway valve 34. The hydraulic lines 35 and 38 will serve as hydraulic feed or return lines, the direction of flow and thus the direction of tool motor rotation being dependent upon the position of the manual four-way valve 34. When the manual four-way valve 34 is positioned in its extreme left-hand position, fluid flow will be induced through conduit 38 to motor 37, thereby causing rotation of the motor in a first direction. The hydraulic fluid returns to the reservoir 79 through conduit 35. A quick disconnect means is shown schematically at 36 for conveniently disconnecting motor 37 and reconnecting a different motor for other appliances. When valve 34 is positioned as shown in FIG. 5 in the centered position, both lines 35 and 38 may drain to reservoirs 11 through return 66. When valve 34 is positioned in its extreme right-hand position, fluid flow is induced through line 35 to motor 37 causing rotation in the direction opposite from previously described above. The hydraulic fluid is returned to reservoir 11 through line 38 by way of return 66.

In operating the device shown on the drawing as a concrete slab saw, the vehicle is first placed on the surface upon which the cut is to be made. The fluid level in the reservoir 11 is checked by visual inspection through filler cap 112 to insure that the screen 12 is fully flooded to avoid any intake of air into the hydraulic pumps 1 and 32. The rear wheels 86 and 86' are then checked to see that locking hubs 87 and 87' are securely locked and that the toothed clutch halves 81 and 82 and 81' and 82' are securely interengaged so that rotation of midaxle 83 will rotate the wheels. The saw mechanism including the rotatively mounted abrasive blade 56 mounted on the output shaft of hydraulic motor 57 is then carefully examined to insure that it is in proper operating condition. The gasoline motor 61 is then started and the gauges and control showing the engine functions and the hydraulic pressure output of pumps 1 and 32 inspected to see that they are providing hydraulic fluid at the proper pressures and that the engine is functioning properly. The machine is then manipulated by hand to the location at which the saw kerf is to be made and lined up carefully so that straight forward movement of the vehicle will cause saw blade 56 to follow the line of cut desired. At that time, the tool mount 103 is lowered a sufficient distance so that castor wheels 50 and 50' are rotated upwardly from the support surface, and the full weight of the vehicle is supported by wheels 86, 86' and 94. Valve 32 is then opened to start rotation of the saw blade 56 and the flow of cooling and lubricating fluid directed to the saw kerf, in this case water, is started by means of well known facilities not shown in the drawing. Tool mount 103 is then slowly lowered by opening valve 14 until the rapidly rotating saw blade 56 has assumed the proper depth of cut in the support surface. Blade 56 continues to rotate while cutting the saw kerf to the desired depth. When the desired depth of cut is reached, valve 5 is opened to the extreme right-hand position as shown in FIG. 4 so that carefully regulated forward motion of the vehicle is induced by hydraulic motor 9 acting through the drive mechanism connected to wheels 86 and 86'. The vehicle slowly moves forward cutting a saw kerf the depth desired at the optimum feed rate for the particular saw blade and depth of cut. The cutting blade 56 as shown is positioned inside or in line with the path of travel of the drivewheels 86 and 86' so that the vehicle tends to cut a straight line without operator assistance.

Should the operator desire to make a slight correction in the direction of travel of the vehicle, or in the instance in which a long, carefully controlled, arc type cut is desired, the vehicle is adapted for such slight corrections by the steering mechanism described above. Should the operator need to steer to the left from the straight line of cut, the harmonic drive mechanism connected to the right drive wheel 86 is activated by braking or stopping the wave generator 140 so that the flexspline 144 has a slightly increased rate of rotation induced therein. This causes wheel 86 to rotate at a differentially increased rate of rotation, thereby causing the vehicle to turn gradually to the left. Similarly, should the operator desire to turn the vehicle gradually to the right, the harmonic drive connected to the left-hand wheel is activated by slowing or stopping the wave generator 140 so that flexspline 144 is differentially increased in rotational speed. Wheel 86 thus increases its rate of rotation slightly causing the vehicle to steer slightly to the right.

The vehicle may be also used as a power supply for other concrete manipulating devices such as power wall saws, hand saws, core drills, breakers, chippers and other well known devices used in manipulating, breaking and sawing hard concrete. A tool stand such as is shown in my co-pending patent application in the U.S. Ser. No. 952,916 filed Oct. 19, 1978 (now U.S. Pat. No. 4,234,155) may be attached directly to the cross bar 102 of tool mount 103 and transported to and from the work site by the vehicle described herein. Wall saws, core drills and other devices may be readily attached to the tool stand and conveniently used for their intended purposes.

While the invention has been shown and described in relation to a specific preferred embodiment, it is to be understood that various modifications within the teachings herein are included within the scope of the appended claims.

I claim:

1. A self-propelled hydraulic power supply vehicle comprising:
   a hydraulic reservoir and frame of hollow structural members joined to form an open loop hydraulic fluid reservoir, said reservoir having exterior surfaces thereon exposed to dissipate heat from the hydraulic fluid contained therein to the atmosphere, said reservoir and frame providing a structural frame for the entire vehicle;
   rear driving wheels for supporting said vehicle on a support surface;
   a prime mover fixedly attached to and supported by said reservoir and frame;
   at least one hydraulic pump driven by said prime mover;
   hydraulically actuated tool mounting assembly pivotally attached to said reservoir and frame for movement of a tool from a first operating position to a second operating position relative to a support surface;

driving and steering means operatively engaged with said wheels for driving and steering said vehicle;

a castor arm pivotally mounted on said reservoir and frame;

castor wheels fixedly mounted on said castor arms adjacent to said rear driving wheels and adapted to pivot from a first position into a support surface engaging position whereby said rear driving wheels are disengaged from said surface;

a cam fixedly mounted on said tool mounting assembly for engagement with said castor arm whereby raising said tool mounting assembly to a specified height engages said cam with said castor arm forcing said castor arms and attached castor wheels to engage a support surface and lift said vehicle;

said reservoir and frame and the hydraulic fluid contained therein with said driving and steering means thereon providing a stable yet portable hydraulic tool mounting platform.

2. The device of claim 1 further comprising a hydraulically actuated saw blade journaled for rotation on said tool mounting assembly operatively connected to a source of pressurized hydraulic fluid.

3. The device of claim 1 wherein said open loop hydraulic reservoir is connected at one end of said open loop to the return line of at least one said hydraulic pump and connected at the opposite end of said open loop to the intake line of at least one said hydraulic pump whereby said open loop reservoir becomes a closed loop reservoir with hydraulic fluid circulating entirely therethrough for maximum heat dissipation.

4. The device of claim 1 further comprising submerged auxiliary cooling tube means fixed within said reservoir and frame means to transfer heat from said hydraulic fluid to a coolant.

5. The device of claim 1 wherein said driving and steering means comprises:

at least two drive wheels;

said drive wheels having a common axle, said axle being twice parted perpendicular to its axis and wherein each of said drive wheels is attached for rotation upon each of said axle parts;

means for differentially driving each said axle part;

braking means for selectively slowing or halting rotative motion for each of said axle parts;

whereby a braking of one part of said axle and its accompanying drive wheel causes said other part of said axle and drive wheel to turn said vehicle about a support surface and whereby a simultaneous braking of both parts of said axle produces a braking effect upon said vehicle.

6. The device of claim 5 further comprising a disengaging clutch for each of said drive wheels whereby said drive wheels may be disengaged from their attachment to said parts of said axle so that they can free wheel upon said parts of said axle.

7. The hydraulic power supply vehicle of claim 1 wherein said driving and steering means are hydraulically actuated.

* * * * *